United States Patent [19]

Mayes

[11] 4,272,402
[45] Jun. 9, 1981

[54] PROCESS FOR REGENERATING FLUIDIZABLE PARTICULATE CRACKING CATALYSTS

[75] Inventor: Warden W. Mayes, Big Spring, Tex.

[73] Assignee: Cosden Technology, Inc., Tex.

[21] Appl. No.: 58,129

[22] Filed: Jul. 16, 1979

[51] Int. Cl.³ .................. B01J 29/38; B01J 21/20; C10G 11/18; C10G 11/05
[52] U.S. Cl. .................. 252/417; 208/DIG. 1; 208/113; 208/120; 208/164; 252/419; 422/144
[58] Field of Search .................. 252/417, 419; 208/164

[56] References Cited

U.S. PATENT DOCUMENTS

| | | | |
|---|---|---|---|
| 2,387,798 | 10/1945 | Kubicek et al. | 252/417 |
| 2,902,432 | 9/1959 | Codet et al. | 252/417 |
| 3,351,548 | 11/1967 | Phyme et al. | 208/120 |
| 3,909,392 | 9/1975 | Horecky, Jr. et al. | 208/120 |
| 4,035,284 | 7/1977 | Gross et al. | 252/477 |
| 4,093,537 | 6/1978 | Gross et al. | 252/417 |
| 4,116,814 | 9/1978 | Zahner | 252/417 |
| 4,167,492 | 9/1979 | Varady | 252/417 |
| 4,197,189 | 4/1980 | Thompson et al. | 208/164 |
| 4,219,442 | 8/1980 | Vickers | 252/417 |

FOREIGN PATENT DOCUMENTS 1495843 12/1977 United Kingdom .................. 252/417

Primary Examiner—P. E. Konopka

[57] ABSTRACT

A process and apparatus for regenerating fluidizable particulate cracking catalysts wherein a mixture of spent catalyst particles contaminated with carbonaceous deposits from a catalytic cracker and sufficient hot regenerated catalyst particles to bring the temperature of the mixture to the minimum temperature at which rapid oxidation of the carbonaceous deposits will be induced, are entrained in a high velocity gas stream containing sufficient oxygen to oxidize substantially all of the carbonaceous deposits on the spent catalyst particles to carbon dioxide and carbon monoxide and the resulting dilute phase catalyst particle stream is passed upwardly through a primary regeneration zone wherein the carbonaceous deposits are oxidized and the catalyst particles regenerated to a carbon content of less than 0.1%; the catalyst particles being passed to a dense phase fluidized bed of regenerated particles in a secondary regeneration zone where the combustion heat is absorbed by the particles and residual carbon monoxide is oxidized to carbon dioxide to produce flue gases containing less than 1,500 ppm carbon monoxide.

44 Claims, 1 Drawing Figure

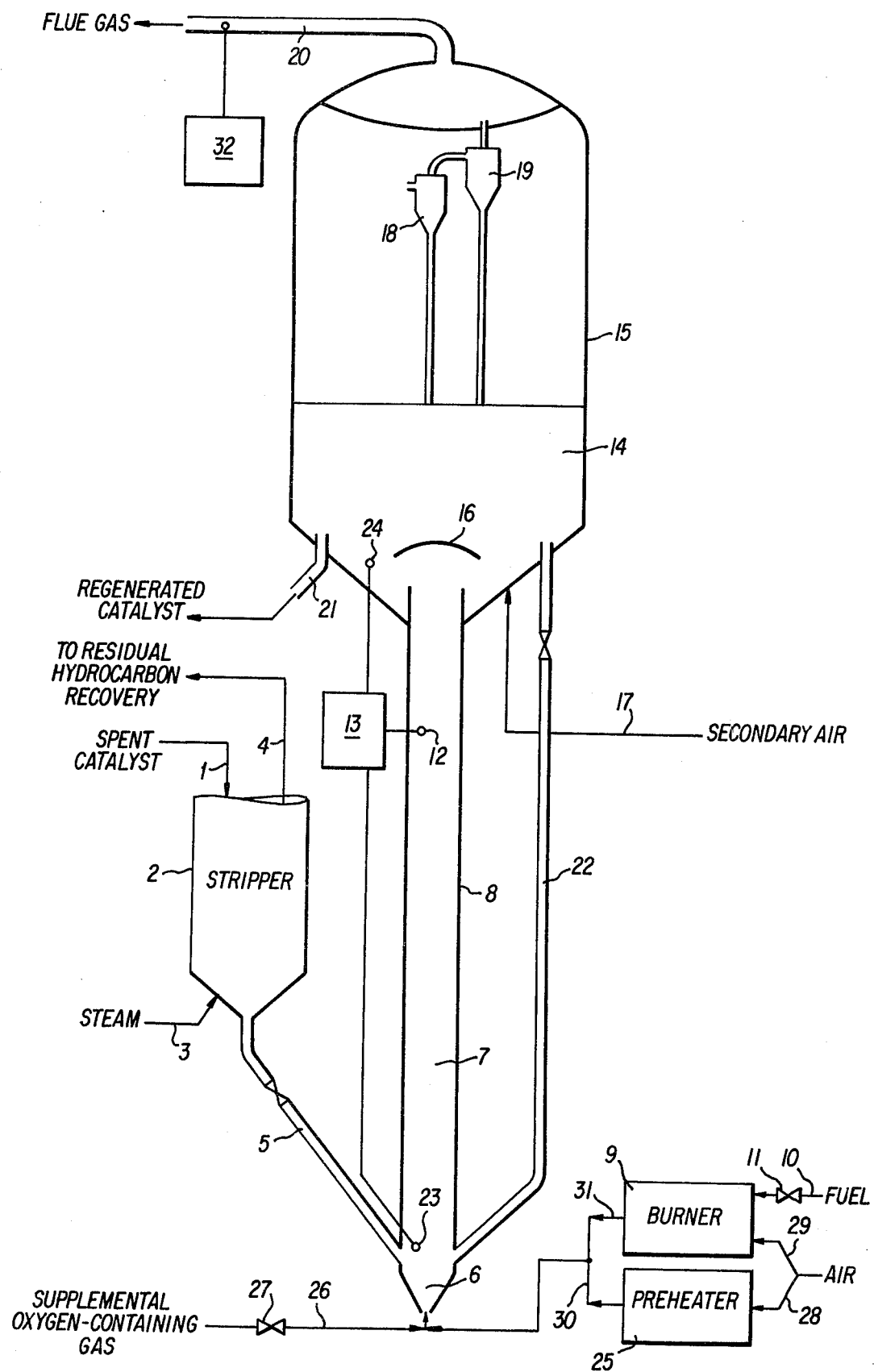

PROCESS FOR REGENERATING FLUIDIZABLE PARTICULATE CRACKING CATALYSTS

BACKGROUND OF THE INVENTION

Fluid catalytic cracking has been widely adopted for cracking higher boiling petroleum fractions. This process utilizes a finely-divided solid catalyst which is conveyed between the cracking zone, and a separate zone where it is regenerated by controlled oxidation of carbonaceous deposits formed on the surface of the catalyst particles during the cracking reaction.

In early fluid catalytic cracking plants naturally occurring clay catalysts were used. Physical breakdown of such catalysts occurred at temperatures above approximately 1200° F. Regeneration at higher temperatures was known to have certain advantages but was limited by the temperature at which the catalyst began to physically fragment, sometimes referred to as cindering. Later, synthetically produced catalysts replaced the natural clay catalysts because they enhanced the yield, and produced more desirable product mixtures. With the further development of synthetic catalysts, particularly the molecular sieve type, it became possible to operate at higher temperatures without cindering.

Development of fluid catalytic cracking was also limited by the yield of carbonaceous deposits, sometimes called coke, being greater than that required to supply the necessary heat to sustain the process in a balanced mode. Various approaches were developed to regenerate catalyst, while maintaining a heat balance with the cracking process. Schemes such as installing steam coils within the regeneration zone, and circulation of fluidized catalyst through shell and tube heat exchangers were utilized to remove heat from the regeneration zone in an effort to maintain a steady state condition with respect to coke buildup on the catalyst. It developed that catalyst regeneration usually was accomplished by a partial oxidation in which coke was converted to a mixture of water, carbon dioxide, and carbon monoxide.

Because of the catalyst temperature and coke yield limitations, complete oxidation of the carbonaceous deposits to $CO_2$ and water was avoided. With the development of molecular sieve catalysts having higher thermal stability and producing decreased or controllable coke yields, regeneration by complete oxidation of the carbonaceous deposits became feasible. Various attempts have been made to operate the regeneration zone so as to oxidize the carbonaceous deposits such that carbon monoxide concentration in the flue gas is limited to 1500 ppm by volume or less. Promoters have been introduced into the regeneration zone to increase the oxidation reaction rate. Processes and apparatus also have been designed to maintain the catalyst in contact with the oxidation gases during complete oxidation to low carbon monoxide levels so as to absorb as much of the liberated heat as possible.

Kubizek, in U.S. Pat. No. 2,387,798, discloses a system in which spent catalyst from a fluid catalytic cracker is separated from the cracker flue gas and entrained in a gas stream containing from 0.1 to 10% oxygen to burn off carbonaceous deposits and regenerate the catalyst. Temperatures are maintained between 900° and 1000° F. by controlling the oxygen supply and by cooling the conduit through which the catalyst particles and oxygen-containing gas are passed.

Payne, in U.S. Pat. No. 3,351,548, discloses a system in which spent catalyst particles from a fluid catalytic cracker are stripped of adsorbed volatile hydrocarbons, passed in heat-exchange relationship with hot regenerated catalyst and mixed with cooled regenerated catalyst. The mixture is then entrained in an air stream and a portion of the carbonaceous deposits on the spent catalyst particles are removed by oxidation under conditions which leave a desired residual quantity from about 0.1 to about 0.5% residual coke on the catalyst particle.

Horecky et al., in U.S. Pat. No. 3,909,392, discloses a fluid cracking catalyst regeneration system in which spent cracking catalyst is introduced into a fluidized bed of catalyst particles at the base of a regenerator, and oxygen-containing gas is passed upwardly through the bed to maintain the bed in fluidized condition. Some of the catalyst particles are lifted into the upper portion of the reactor and then allowed to fall back in counter-current relation to the flow of gases through the regenerator in order to absorb heat from the departing gases.

Gross et al., in U.S. Pat. No. 4,035,284, discloses a system for regenerating fluid cracking catalyst particles in which spent catalyst particles from a catalytic cracker are mixed with hot regenerated catalyst particles and passed to a dense fluidized bed superimposed by an upflowing disperse suspended catalyst phase of limited particle density in which carbonaceous deposits on the catalyst particles are oxidized to carbon dioxide and carbon monoxide.

Such processes and apparatus for regenerating catalyst particles are subject to numerous disadvantages. The size of the regenerator required may be unduly large, thereby increasing both the expense of constructing the system and the amount of energy required to maintain the regeneration system at operating temperatures. Moreover, despite self-laudatory statements in prior art patents, prior art systems are not as energy-efficient as would be desired in that they do not maximize the retention of heat from the regeneration process in the regenerated catalyst particles. Prior art systems also may not assure complete removal of carbonaceous deposits in order to restore the catalyst particles to maximum activity and selectivity. In order to completely regenerate catalyst particles, it is desirable to reduce the concentration of carbonaceous deposits to a level less than 0.1 weight percent, preferably less than 0.05 weight percent. Prior art processes further may effect insufficient oxidation of the carbonaceous deposits and thus produce exhaust flue gases containing unacceptably high proportions of carbon monoxide. Environmental regulations require that the carbon monoxide concentration of flue gas be less than 1500 ppm for existing facilities and less than 500 ppm for new processing units. Thus, despite the extensive activity in the prior art, there remains a need for a more efficient and effective process and apparatus for regenerating fluidizable cracking catalyst particles.

OBJECTS OF THE INVENTION

Accordingly, it is an object of the present invention to provide a process for regenerating fluidizable cracking catalyst particles which requires only comparatively compact regeneration apparatus.

A further object of the present invention is to provide an apparatus for regenerating fluidizable cracking catalyst particles, which is compact and yet has a high capacity.

Another object of the present invention is to provide a process for regenerating fluidizable cracking catalyst particles which efficiently retains a high proportion of the process heat in the catalyst particles.

It is also an object of the present invention to provide a process and apparatus for regenerating fluidizable cracking catalyst particles which is highly energy efficient and achieves efficient regeneration of the spent catalyst particles at the lowest practicable temperatures.

A further object of the present invention is to provide a process and apparatus for regenerating fluidizable cracking catalyst particles which are effective to reduce the concentration of carbonaceous material on the catalyst particles to 0.1% or less.

Another object of the present invention is to provide a process and apparatus for regenerating fluidizable cracking catalyst particles which emits an environmentally acceptable flue gas.

Yet another object of the present invention is to provide a process and apparatus for regenerating fluidizable cracking catalyst particles which yields flue-gases containing less than 1500 ppm carbon monoxide.

Still another object of the present invention is to provide a process and apparatus for regenerating fluidizable cracking catalyst particles which do not require an excessively large inventory of catalyst particles to be maintained in the system.

SUMMARY OF THE INVENTION

These and other objects of the invention are achieved by providing a process for regenerating spent catalyst particles from a fluid catalytic cracking reaction zone comprising the steps of introducing spent catalyst particles and hot regenerated catalyst particles into an oxygen-containing gas stream to produce a dilute phase catalyst particle stream; the amount of oxygen in said dilute phase stream being sufficient to oxidize substantially all of the carbonaceous deposits on the spent catalyst particles to gaseous combustion products; the temperature of the hot regenerated catalyst particles being greater than the minimum temperature required to initiate rapid oxidation of the carbonaceous deposits on the spent catalyst particles and the proportion of the hot regenerated catalyst introduced into the gas stream being sufficient to raise the temperature of the dilute phase stream to minimum temperature required to induce rapid oxidation of said carbonaceous deposits; passing said dilute phase catalyst particle stream upwardly through a primary regenerating zone while maintaining regenerating conditions therein and oxidizing substantially all the carbonaceous deposits on said spent catalyst particles to gaseous combustion products; passing said dilute phase stream from the top of said primary regeneration zone to the bottom of a dense phase bed of regenerated catalyst particles in a secondary regeneration zone; said particles forming a dense phase in said secondary regeneration zone; separating substantially all of the regenerated catalyst particles from the gaseous combustion products in said secondary regeneration zone; exhausting the gaseous combustion products from said secondary regeneration zone to produce a flue-gas containing less than 1500 ppm carbon monoxide, and withdrawing hot regenerated catalyst containing less than 0.1 weight percent carbon from said secondary regeneration zone.

The objects are further achieved by providing an apparatus for regenerating spent catalyst particles from a fluid catalytic cracking reaction zone; said apparatus comprising an upwardly directed, elongated conduit member defining a primary regeneration zone having upper and lower ends, means for forming a dilute phase stream of spent catalyst particles and hot regenerated catalyst particles entrained in an oxygen containing gas and introducing said dilute phase stream into the lower end of said conduit member, the upper end of said conduit opening into the bottom of a reaction vessel having a cross-sectional area greater than the cross-sectional area of said conduit member, the lower portion of said reaction vessel defining a secondary regeneration zone, means for preventing back flow of catalyst particles from said secondary regeneration zone to the primary regeneration zone through said opening, means for withdrawing regenerated catalyst particles from said secondary regeneration zone, means for exhausting combustion gases from the upper portion of the reaction vessel, and means for conveying a portion of the withdrawn regenerated catalyst to said dilute phase stream forming means.

In further refinements of the process and apparatus of the invention, the primary regeneration zone is a vertically elongated conduit and the secondary regeneration zone is a reaction vessel having a diameter larger than the conduit which forms the primary regeneration zone, the oxygen-containing gas into which the spent catalyst and hot regenerated catalyst particles are introduced is preheated prior to introduction of the catalyst particles, adsorbed volatile hydrocarbons are removed from the spent catalyst particles with a stripping gas prior to introducing the particles into the oxygen-containing gas stream, a secondary oxygen-containing gas is supplied to the lower portion of the secondary regenerating zone, and supplemental oxygen may be added to the oxygen-containing gas stream in which the catalyst particles are entrained.

BRIEF DESCRIPTION OF THE DRAWING

Further details of the invention will be explained with reference to the accompanying drawing which is a schematic representation of an apparatus for practicing the process of the present invention.

DETAILED DESCRIPTION OF THE PREFERRED EMBODIMENTS

Catalysts to which the presently claimed invention is applicable are conventional fluidizable cracking catalysts such as zeolite molecular sieves and/or aluminosilicates having a typical average particle size ranging between about 50 microns and 90 microns. Such catalysts are well known in the art.

The catalyst particles are first separated from the gaseous product stream from the fluid catalytic cracking reaction zone by means of a suitable separating device such as a settling chamber or cyclone separator. The spent catalyst particles are then passed through conduit 1 to a stripping unit 2, and a stripping gas, such as steam, is fed to stripper 2 through conduit 3. In the stripper, the catalyst particles are contacted by the stripping gas, and volatile hydrocarbons which had been adsorbed on the surface of the catalyst particles are stripped away and carried off through conduit 4 to a residual hydrocarbon recovery system (not shown). If desired, the stripping gas and stripped volatile hydrocarbons may be returned to the fluid catalytic cracking reaction zone. Sufficient stripping gas should be passed through the stripper to reduce the level of adsorbed hydrocarbon on the spent catalyst particle to a workable level. If not enough of the adsorbed hydrocarbons are removed from the catalyst particles, the carbon-content of the catalyst particles fed to the regeneration zone will be too high to maintain a proper heat balance when all of the carbonaceous material is oxidized to gaseous products in the primary regeneration zone as hereafter described.

Spent catalyst particles are recovered from the fluid catalytic cracking reaction zone at an elevated temperature. The exact temperature will vary depending upon the parameters of the cracking operation. Generally, however, the temperature of the spent catalyst separated from the cracking product gas stream will lie in the range from about 750° to 1020° F. The stripping operation in stripper 2 should be carefully monitored to minimize the heat loss of the catalyst during stripping, in order to be able to introduce the spent catalyst into the regeneration zones at as high a temperature as possible. Maintaining the catalyst temperature at a high level reduces the amount of heat which must be added to the dilute phase stream in order to bring the dilute phase stream to a temperature at which rapid oxidation of the carbonaceous deposits will occur and enhances the thermal efficiency of the regeneration process.

Spent catalyst particles which have been stripped of adsorbed hydrocarbon are passed through conduit 5 to a mixing zone 6 and introduced into a high velocity stream of oxygen-containing gas therein. It is understood that some oxidation will occur in the mixing zone 6. Mixing zone 6 opens into the primary regeneration zone 7, which in the illustrated embodiment is established in a vertically oriented, elongated conduit 8.

Air is the preferred oxygen-containing gas because of its ready availability. The amount of oxygen supplied by the oxygen-containing gas stream should be sufficient for combustion of substantially all of the carbonaceous deposits on the surface of the spent catalyst particles to gaseous carbon oxides and water. Preferably an amount of oxygen in excess of the required stoichiometric amount is provided to assure substantially complete combustion of all of the carbonaceous material contained on the surface of the catalyst particles to carbon dioxide and water. Stoichiometric excesses of up to 15% or 20% by volume generally may be considered suitable. Greater air excesses should be avoided since additional heat energy is required to bring the excess air to regeneration zone temperatures thereby adversely affecting the thermal efficiency of the regeneration process.

During start-up of the regenerator, the primary regeneration zone 7 is brought up to operating temperature prior to the introduction of any of the spent catalyst through conduit 5 into the mixing zone by combustion of a fuel in a start-up burner 9 with the hot combustion gas piped to the lower end of the primary regeneration zone conduit. Any suitable fuel may be supplied to burner 9 through a conduit 10. Clean-burning gaseous fuels such as natural gas or synthesis gas are highly desirable. A throttle valve 11 is provided on line 10 to facilitate control of the supply of fuel to control the rate of heat-up within the regenerator during start-up. A temperature sensor 12 is disposed in regeneration zone 7 to facilitate monitoring of the thermal conditions therein. Sensor 12 is connected to a suitable monitoring means 13. Air to support combustion is supplied to burner 9 from an air supply through line 29. When the temperature within the primary regeneration zone 7 reaches a sufficiently high level so that rapid oxidation of carbonaceous deposits on spent catalyst particles in an oxygen-containing gas stream will occur, then the introduction of spent catalyst particles is commenced through line 5 into mixing area 6 where the spent fluidizable catalyst particles are entrained in the stream of oxygen-containing gas entering from conduit 31. In steady state operation, there must be enough heat within the primary regeneration zone to raise the temperature of the dilute phase mixture to a sufficient temperature to induce rapid oxidation of the carbonaceous deposits. Generally, a minimum regeneration temperature of at least 1000° F. is required to induce the rapid oxidation, and preferably a temperature in the range between 1050° and 1100° F. The required temperature may be reduced somewhat by incorporating conventional oxidation promoters into the dilute phase stream.

The rate of regeneration depends on temperature; the higher the temperature, the faster the carbonaceous deposits on the spent catalyst particles will be oxidized. Desirably, the average residence time of a catalyst particle in the primary regeneration zone will be less than about 10 seconds; most preferably from 3 to 5 seconds. The temperature of the dilute phase stream should be high enough that substantially all of the carbonaceous deposits on the spent catalyst will be oxidized to gaseous carbon oxides in the primary regeneration zone. Thus, within certain limits there is an inverse relationship between the average residence time of catalyst particles in the primary regeneration zone and the minimum temperature required to induce rapid oxidation of the carbonaceous deposits on the surface of the catalyst particles, i.e., oxidation of substantially all of the carbonaceous deposits while the particles are in the primary regeneration zone. The longer the residence time, the lower the minimum temperature may be. Generally, the rate of oxidation at temperatures below 1000° F. is too slow for effective regeneration. Preferably, the temperature of the dilute phase stream entering the primary regeneration zone will be between about 1050° F. and 1100° F. Higher temperatures are generated in the upper portion of the primary zone by the oxidation of the carbonaceous deposits.

As rapid oxidation of the carbonaceous deposits on the surface of the spent catalyst particles commences, significant quantities of heat are released. Accordingly, valve 11 can be partially closed to reduce the supply of fuel to burner 9 and the heat of combustion of the carbonaceous deposits can be relied on to raise the temperature to the level necessary to initiate rapid regeneration.

The flow of gas through conduit 8 is maintained at a sufficient rate to carry the catalyst particles upwardly through regeneration zone 7, so that a dilute phase of entrained catalyst particles is established in the primary regeneration zone. By dilute phase is meant that the particles are entrained in the gas stream and are carried substantially quantitively along with the gaseous portion of the stream. As hot catalyst particles are carried upwardly through regeneration zone 7 by the hot oxygen-containing gas stream, substantially complete oxidation of the carbonaceous deposits on the catalyst particles to gaseous combustion products, i.e., water, carbon monoxide and carbon dioxide, takes place, and the particles are regenerated. The activity of the regenerated catalyst has been found to be appreciably greater when the concentration of carbonaceous deposits on the catalyst has been reduced to less than 0.1% by weight. Accordingly, oxidation of carbonaceous deposits on the spent catalyst material in the primary regeneration zone should be carried out to a degree of completeness at least sufficient to reduce the residual carbon content on the regenerated catalyst particles to less than 0.1%. Preferably, the regenerated catalyst particles will contain less than 0.05 weight% carbon. The rate of flow of the oxygen-containing gas stream supplied to the primary regeneration zone primarily determines the transit time of the catalyst particles through the primary zone. Once regeneration temperatures are reached in the primary regeneration zone, the time required for oxidation of the carbonaceous deposits on the spent catalyst particles in the presence of sufficient oxygen may be relatively brief. Preferably, the rate at which particles and oxygen-containing gas are supplied to the regenerator is controlled to provide an average particle transit time through the primary zone between 3 and 10 seconds. Preferably, the average transit time for the catalyst particles through the primary regeneration zone will range between 3 and 5 seconds.

The upper end of conduit 8 opens into the bottom of a secondary regeneration zone 14 which is established in the lower portion of a reaction vessel 15. The diameter of reaction vessel 15 and the corresponding regeneration zone 14 is substantially greater than that of conduit 8 and regeneration zone 7. Consequently, the velocity of the gas stream is reduced in the secondary regeneration zone 14 to a level where the catalyst particles are no longer carried along with the gas stream, but instead settle out to form a dense particle phase bed in regeneration zone 14. By dense particle phase is meant that substantially all of the catalyst particles are not entrained in the gas stream, although entrainment of a minor proportion of the particles may occur. Desirably, substantially all of the catalyst particles will settle out of the gas stream in the fluidized bed in regeneration zone 14. A baffle member 16 is provided over the end of conduit 8 to prevent particles from the dense bed from obstructing the conduit outlet. Other methods could also be used to minimize the back flow of catalyst particles from the secondary regeneration zone 14 to the primary regeneration zone 7. The rate of flow of the gas stream and the relative diameters of the two regeneration zones are proportioned so that catalyst particles in the dense bed are suspended in a fluidized state without entrainment of any significant proportion of the particles in the departing flue gases so that a substantially static fluidized particle bed is established in the secondary regeneration zone 14 at the base of reaction vessel 15.

In order to facilitate further control of the fluidized bed and promote uniform suspension of the particles throughout the bed, secondary gas can be introduced at the bottom of reaction vessel 15 through conduit 17. Though only a single inlet is shown from conduit 17 to the base of reaction vessel 15, it is understood that a plurality of inlets could be provided to assure uniform flow of the suspending gas throughout the bed. Desirably, the secondary gas will be an oxygen-containing gas such as air, in order to ensure that all of the carbonaceous deposits on the catalyst particles are completely oxidized and that any residual carbon monoxide in the gases entering the second regeneration zone from conduit 8 is oxidized to carbon dioxide.

Establishing a dense phase of regenerated catalyst particles in the fluidized bed in secondary regeneration zone 14 through which the hot combustion gases from the first regeneration zone 7 must pass assures that the maximum amount of process heat is extracted from the combustion gases and stored in the regenerated catalyst particles in the dense phase bed.

The length of time that catalyst particles are retained in the secondary regeneration zone should be sufficiently long to enable the catalyst particles to absorb a maximum amount of heat from the hot gases. Preferably, the dense phase catalyst particle bed is sized such that the average particle retention time in the bed will range from about 15 minutes to about 2 hours.

The gases exiting from the dense phase fluidized bed pass upwardly through the upper portion of reaction vessel 15 via primary cyclones 18, secondary cyclones 19 and conduit 20. If desired, several parallel primary cyclones each associated with a secondary cyclone may be provided.

Regenerated catalyst particles from which substantially all of the carbonaceous deposits have been removed are withdrawn from the dense phase fluidized bed in regeneration zone 14 through outlet conduit 21. The rate of withdrawal should be correlated with the rate at which spent catalyst particles are introduced into the mixing zone 6 so that the volume of the dense phase fluidized bed in regeneration vessel 15 remains relatively constant.

A portion of the hot regenerated catalyst is withdrawn from reaction vessel 15 through conduit 22 to the mixing zone 6 where it is introduced into the high velocity stream of oxygen-containing gas. The recycled regenerated catalyst which enters mixing zone 6 from line 22 is, of course, at substantially the temperature of the dense phase bed in regeneration zone 14 which is, to be sure, appreciably higher than the minimum temperature required to induce rapid oxidation of the carbonaceous deposits on the spent catalyst particle. As the recycled catalyst is entrained in the oxygen-containing gas stream and mixed with the spent catalyst, heat is transferred from the recycled catalyst to the spent catalyst and the oxygen-containing gas. The recycled catalyst thus serves to raise the temperature of the spent catalyst to the temperature required to result in rapid regeneration. Accordingly, as recycled catalyst is added to the spent catalyst, the supply of fuel to burner 9 is correspondingly reduced until all of the heat required to bring the spent catalyst to the temperature at which rapid oxidation occurs is provided by the recycled catalyst, and the flow of fuel through conduit 10 to burner 9 is completely cut off by shutting valve 11.

The proportion of recycled catalyst which must be added to the spent catalyst to bring the spent catalyst to the minimum regeneration temperature varies depending upon the temperature of the spent catalyst coming from the stripper and the temperature of the recycled catalyst coming from the fluidized bed in secondary regeneration zone 14 in reaction vessel 15. In most instances, the amount of recycled catalyst will range from 20 to 100% of the amount of spent catalyst introduced into mixing zone 6 through line 5 although proportions outside that range may be appropriate under certain circumstances. A temperature sensing device 23 may be provided in mixing zone 6 to facilitate monitoring of the temperature of the mixed catalyst particle containing gas stream to assure that a sufficient temperature has been achieved upon introduction of the dilute phase stream into the primary regeneration zone. The temperature of the dilute phase stream can be controlled in response to the measured value by adjusting the proportion of spent catalyst particles, hot regenerated catalyst particles or oxygen-containing gas introduced into the mixing zone.

The order of admixture of the catalyst particles and the oxygen-containing gas stream is not critical. Thus, the spent catalyst particles may first be entrained in the oxygen-containing gas stream after which the recycled regenerated catalyst is introduced and entrained at a point downstream from the point at which the spent catalyst is introduced. Alternatively, the recycled regenerated catalyst could be introduced first followed by the spent catalyst. Another possible alternative would be to mix the spent catalyst and the recycled regenerated catalyst and thereafter introduce the catalyst mixture into the oxygen-containing gas stream. All that is important is that both the spent catalyst and the hot recycled catalyst be entrained and intimately mixed in the oxygen-containing gas stream and that the resulting dilute phase mixture reach temperatures which will initiate regeneration within the primary regeneration zone, preferably within the lower portion thereof.

As oxidation of the carbonaceous deposits on the spent catalyst particles proceeds, temperatures substantially in excess of the minimum temperature required to initiate regeneration are established in primary regeneration zone 7. The temperature in any part of the regeneration zone should not exceed about 1500° F. or degradation of the catalyst may occur. Desirably, the temperature in either regeneration zone will never exceed 1450° F. Preferably, when steady state operations are achieved, the temperatures in regeneration zone 7 will range between 1200° and 1400° F., most preferably between about 1250° and 1350° F. The temperature in regeneration zone 7 can be monitored by sensor 12 and can be controlled by adjusting the rates and temperature at which spent catalyst particles, hot regenerated catalyst particles and oxygen-containing gas are supplied to the mixing zone.

Since temperatures in the secondary regeneration zone 14 are established primarily by the temperature of the hot gases exiting from conduit 8 into the base of the fluidized bed, temperatures in the secondary regeneration zone will be similar to those encountered in the primary regeneration zone 7. However, it must be recognized that if the hot gases entering the secondary regeneration zone contain appreciable carbon monoxide which is oxidized to carbon dioxide in the secondary regeneration zone, then temperatures in the secondary zone may be higher than those in the primary regeneration zone. Likewise, if carbonaceous materials are substantially completely oxidized in the primary regeneration zone so that no significant amount of oxidation occurs in the secondary zone, then the introduction of secondary fluidizing gas through conduit 17 into the base of the fluidized bed may result in temperatures in the secondary regeneration zone which are lower than the temperature prevailing in the primary regeneration zone. Preferably, the temperature in the dense particle phase in the secondary regeneration zone will lie in the range of from about 1250° to 1400° F., most preferably from 1300° to 1400° F. The temperature in the secondary regeneration zone may be monitored by means of a temperature sensor 24. Adjustment of the temperature may be effected by varying the amount of secondary air introduced into the secondary regeneration zone.

In order to further reduce the amount of heat which must be supplied by recycled catalyst, the oxygen-containing gas stream introduced through conduit 7 may be preheated prior to introduction into the mixing zone. For this purpose, a preheater 25 may be provided. Combustion preheating may be employed such as in the start-up burner, although the resulting reduction in the oxygen content of the gas is not considered desirable. It is preferred that the oxygen-containing gas be preheated by passing it in heat-exchange relationship with a source of process heat so that it is preheated without consuming oxygen. Any suitable source may be utilized. For example, the regenerator flue gases of line 20 may be used to preheat the oxygen-containing gas stream. In order to further conserve energy, the flue gas of line 20 may be used as a source of heat to generate steam in addition to preheating the combustion air. Desirably, the oxygen-containing gas is preheated to a temperature lying in the range from about 750° to about 900° F. Preheated air from the preheater 25 is introduced to the mixing zone 6 through line 30.

Additional oxygen-containing gas may be supplied, if desired, to the base of the primary regeneration zone 7 through conduit 26. Supplemental oxygen supplied through conduit 26 may serve to increase the processing capacity of the regenerator. Valve means 27 is provided on conduit 26 to facilitate control of the introduction of supplemental oxygen to the regenerator. Oxygen-rich gases of relatively high $O_2$ content are commercially available at comparatively modest cost and may be utilized to good effect in the process and apparatus in the present invention. The introduction of supplemental oxygen should be carefully controlled to prevent overheating of the regenerator or isolated zones thereof in order to avoid degradation of the catalyst or damage to the regenerator apparatus.

Combustion gases from the secondary regeneration zone pass to a primary cyclone 18 for the removal of entrained catalyst particles and the flue gas from cyclone 18 flows through secondary cyclone 19 for further catalyst removal. Flue gases from cyclone 19 exit vessel 15 via conduit 20. Catalyst particles separated from the flue gases in cyclones 18 and 19 are returned to the dense fluid bed of the lower section of the secondary regeneration zone 14.

Environmental regulations restrict the carbon monoxide content of flue gases exhausted to the atmosphere. Accordingly, sufficient oxygen-containing gas must be supplied to the regenerator to assure substantially complete combustion of the carbonaceous material to carbon dioxide and water. In accordance with the present invention, sufficient oxygen is supplied to the regenerator to reduce the carbon monoxide content of the flue gases to less than 1500 ppm by volume. Preferably, the addition of oxygen-containing gas is controlled to reduce the carbon monoxide content of the flue gases to less than 500 ppm.

To be sure that sufficient oxygen is supplied to the regenerator to completely oxidize all of the carbonaceous material, the residual oxygen content of the flue gases exhausted through conduit 20 may be monitored. Desirably, the oxygen content of the flue gases exhausted from the secondary regeneration zone will be maintained between about 1 and 5%. The amount of oxygen-containing gas supplied to the primary regeneration zone and/or the secondary regeneration zone may be controlled in response to the measured value to see to it that the desired level is maintained. For this purpose, conduit 20 is connected to an oxygen analyzer 32.

The regeneration process and apparatus of the present invention are both remarkably effective and efficient. Consistent regeneration of spent catalyst particles to a residual carbon content of less than 0.1% is readily obtained with only a minimal energy input once steady state operation is achieved. Moreover, the size of the apparatus required for regeneration of spent catalyst particles according to the present invention is generally smaller than the size of prior art regenerators of comparable capacity. A regenerator constructed according to the present invention may have a total internal volume of up to 20% less for a given rate of hydrocarbon feed to the cracking zone and conversion level. Not only does this result in savings in initial construction cost and capital investment, but the reduction in size also may result in a reduction in energy costs and/or other operating costs. The production of catalyst fines and the size of the catalyst inventory required for a system of given capacity are also reduced with corresponding cost savings.

The foregoing description has been set forth merely for purposes of illustration and is not intended as limitive. Since modifications of the disclosed process and apparatus may occur to persons skilled in the art, the scope of the invention is to be limited solely by the scope of the appended claims.

I claim:

1. A process for regenerating spent fluidizable catalyst particles contaminated with carbonaceous deposits comprising the steps of:

introducing spent catalyst particles and hot regenerated catalyst particles directly from a secondary regeneration dense phase zone into a stream of oxygen-containing gas and entraining the catalyst particles in the gas stream to produce a dilute phase catalyst particle stream; the amount of oxygen in said dilute phase stream being sufficient to oxidize substantially all of the carbonaceous deposits on said spent catalyst particles to gaseous combustion products; the temperature of the hot regenerated catalyst particles being greater than the minimum temperature required to initiate rapid oxidation of the carbonaceous deposits on the spent catalyst particles, and the proportion of hot regenerated catalyst introduced into said gas stream being sufficient to raise the temperature of the dilute phase stream to at least the minimum temperature required to induce rapid oxidation of said carbonaceous deposit;

passing said dilute phase particle stream through an upwardly directed primary regeneration zone while maintaining regeneration conditions suitable for rapid oxidation of said carbonaceous deposit in said primary zone and oxidizing substantially all of the carbonaceous deposits on said spent catalyst particles to gaseous combustion products in said dilute phase stream in the primary zone to regenerate the catalyst particles;

passing said dilute phase stream containing regenerated catalyst particles and gaseous combustion products from the top of said primary zone to the bottom of a dense phase bed of regenerated catalyst particles in a secondary regeneration zone disposed above the primary zone;

introducing a secondary oxygen-containing gas into the lower portion of the dense phase bed in the secondary regeneration zone to assist in maintaining the dense phase bed in a fluidized state and to assure substantially complete combustion of carbon monoxide in the dense phase bed to carbon dioxide;

exhausting the gaseous combustion products from said secondary regeneration zone; said exhausted gaseous products containing between about 1 percent and about 5 percent oxygen and less than 1,500 ppm by volume carbon monoxide; and withdrawing hot regenerated catalyst particles from said secondary regeneration zone; said regenerated catalyst particles containing less than 0.1 weight percent carbon.

2. A process according to claim 1 wherein the amount of oxygen in said oxygen-containing gas stream introduced into said primary regeneration zone is sufficient to oxidize all of the carbonaceous deposits on said spent catalyst particles to carbon dioxide and water.

3. A process according to claim 2 wherein the amount of oxygen in said oxygen-containing gas stream is in excess of the stoichiometric amount required to oxidize all of the carbonaceous deposits on said spent catalyst particles to carbon dioxide and water.

4. A process according to claim 3 wherein the oxygen excess is up to 20 percent by volume of the stoichiometric requirement.

5. A process according to claim 1 wherein spent catalyst particles are first entrained in the oxygen-containing gas stream and hot regenerated catalyst particles are thereafter entrained in the spent catalyst particles and oxygen-containing gas stream.

6. A process according to claim 1 wherein hot regenerated catalyst particles are first entrained in the oxygen-containing gas stream and spent catalyst particles are thereafter entrained in the regenerated catalyst particle and oxygen-containing gas stream.

7. A process according to claim 1 wherein spent catalyst particles and hot regenerated catalyst particles are admixed and the resulting admixture is introduced into said oxygen-containing gas stream.

8. A process according to claim 1 wherein said oxygen-containing gas stream is preheated prior to introduction of catalyst particles thereinto.

9. A process according to claim 8 wherein said preheating is effected by passing the oxygen-containing gas stream in heat-exchange relationship with a source of process heat.

10. A process according to claim 1 further comprising the step of introducing supplemental oxygen-containing gas into the lower portion of the primary regeneration zone.

11. A process according to claim 1 wherein said catalyst is a hydrocarbon cracking catalyst further comprising the step of stripping adsorbed volatile hydrocarbons from the spent catalyst particles by contacting the particles with a stripping gas prior to introducing the spent catalyst particles into the oxygen-containing gas stream.

12. A process according to claim 11 wherein said stripping gas is steam.

13. A process according to claim 11 wherein the stripped, volatile hydrocabons are returned to a fluid catalytic cracking reaction zone.

14. A process according to claim 1 wherein temperature of the dilute phase stream upon entering the primary regeneration zone is at least 1000° F.

15. A process according to claim 14 wherein the temperature of the dilute phase stream upon entering the primary regeneration zone is between about 1050° F. and about 1100° F.

16. A process according to claim 1 further comprising the step of monitoring the temperature of the dilute phase catalyst particle stream in the mixing zone to assure that the minimum temperature of said dilute phase stream is sufficient to induce rapid oxidation of the carbonaceous deposits on the spent catalyst within the primary regeneration zone.

17. A process according to claim 1 further comprising the additional steps of measuring the temperature of the dilute phase catalyst particle stream and adjusting the proportion of at least one member of the group consisting of the spent catalyst particles, the hot regenerated catalyst particles and the oxygen-containing gas stream combined to produce the dilute phase stream to assure that the dilute phase stream reaches the minimum temperature required to induce rapid oxidation of the carbonaceous deposits on the spent catalyst.

18. A process according to claim 1 wherein a catalytic oxidation promoter is introduced into the primary regeneration zone.

19. A process according to claim 1 wherein additional oxygen-containing gas is introduced into the lower portion of the secondary regeneration zone to assure complete oxidation of carbon monoxide to carbon dioxide.

20. A process according to claim 1 wherein the average residence time of a catalyst particle in the primary regeneration zone is from about 3 to about 10 seconds.

21. A process according to claim 20 wherein the average residence time of a catalyst particle in the primary regeneration zone is about 3 to about 5 seconds.

22. A process according to claim 1 wherein the average residence time of a catalyst particle in the secondary regeneration zone lies in the range from about 15 minutes to about 2 hours.

23. A process according to claim 1 wherein hot regenerated catalyst withdrawn from the secondary regeneration zone is introduced into the oxygen-containing gas stream.

24. A process according to claim 1 wherein the temperature in the primary regeneration zone during steady state operation lies in the range from about 1200° to about 1400° F.

25. A process according to claim 24 wherein the temperature in the primary regeneration zone during steady state operation lies in the range from about 1250° to about 1350° F.

26. A process according to claim 1 wherein the temperature in the secondary regeneration zone during steady state operation lies in the range from about 1250° to about 1400° F.

27. A process according to claim 26 wherein the temperature in the secondary regeneration zone lies in the range from about 1300° to about 1400° F.

28. A process according to claim 1 wherein the maximum temperature in the primary and secondary regeneration zones is less than 1450° F.

29. A process according to claim 1 further comprising the step of monitoring the temperature in the primary regeneration zone.

30. A process according to claim 1 further comprising the step of monitoring the temperature in the secondary regeneration zone.

31. A process according to claim 1 further comprising the steps of measuring the temperature in the primary regeneration zone and controlling the amount of oxygen entering the zone in response to the measured value to assure that the temperature in the zone is maintained within a desired range.

32. A process according to claim 1 further comprising the step of measuring the temperature in the secondary regeneration zone and controlling the amount of secondary air introduced to said secondary regeneration zone to assure that the temperature in said zone is maintained at a desired level.

33. A process according to claim 1 wherein the regenerated catalyst particles contain less than about 0.05% carbon.

34. A process according to claim 1 wherein the gaseous stream exhausted from said secondary regeneration zone contains less than 500 parts per million carbon monoxide.

35. A process according to claim 1 further comprising the step of monitoring the oxygen content of the gases exhausted from the secondary regeneration zone.

36. A process according to claim 1 further comprising the steps of measuring the oxygen content of the gases exhausted from the secondary regeneration zone and controlling the amount of oxygen supplied to the primary regeneration zone or to the secondary regeneration zone in response to said measured value to assure that an excess of oxygen is supplied to the system.

37. A process according to claim 1 further comprising the step of removing residual entrained catalyst particles from the exhausted gaseous combustion products by means of a cyclone separator.

38. A process according to claim 37 wherein said exhausted gaseous combustion products are passed successively through a primary cyclone separator and an associated secondary cyclone separator.

39. A process according to claim 37 wherein the separated particles are returned to the dense bed of hot regenerated catalyst particles in the secondary regeneration zone.

40. A process according to claim 1 wherein the oxygen-containing gas is preheated to a temperature lying in the range from about 750° to 900° F.

41. A process according to claim 1 wherein the spent catalyst particles introduced into the oxygen-containing gas stream have an initial temperature lying in the range from about 750° to about 1020° F.

42. A process according to claim 41 wherein said spent catalyst particles have an initial temperature in the range from about 900° to 975° F.

43. A process according to claim 1 wherein said upwardly directed primary regeneration zone is an elongated vertical conduit.

44. A process according to claim 1 wherein the amount of hot regenerated catalyst introduced into the oxygen-containing gas stream is from about 20 to about 100% of the amount of spent catalyst introduced into the oxygen-containing gas stream.

* * * * *